United States Patent

Senyarich et al.

[11] Patent Number: 6,042,970
[45] Date of Patent: Mar. 28, 2000

[54] METHOD OF FORMING A SEPARATOR FOR ALKALINE ELECTROLYTE SECONDARY ELECTRIC CELL

[75] Inventors: Stéphane Senyarich, Mornac; Patrick Viaud, Bordeaux, both of France

[73] Assignee: Saft, Romainville, France

[21] Appl. No.: 08/943,012

[22] Filed: Oct. 2, 1997

[30] Foreign Application Priority Data

Oct. 3, 1996 [FR] France ................................ 96 12056

[51] Int. Cl.[7] .................................................. H01M 2/16
[52] U.S. Cl. ............................................. 429/248; 429/249
[58] Field of Search ........................................ 429/248, 249

[56] References Cited

U.S. PATENT DOCUMENTS 5,798,189  8/1998  Hayashida et al. ..................... 429/101

FOREIGN PATENT DOCUMENTS

0680107A1  11/1995  European Pat. Off. .
05234577   2/1992   Japan .............................. H01M 2/16
WO 93/01622  1/1993  WIPO ............................. H01M 2/16

OTHER PUBLICATIONS

Patent Abstracts of Japan, vol. 017, No. 683 (E–1477), Dec. 15, 1993 corresponding to JP 05 234577 A (Yuasa Corp) dated Sep. 10, 1993.

*Primary Examiner*—Maria Nuzzolillo
*Assistant Examiner*—Tracy Dove
*Attorney, Agent, or Firm*—Sughrue, Mion, Zinn, Macpeak & Seas, PLLC

[57] ABSTRACT

An alkaline electrolyte secondary electric cell comprises at least one positive electrode and one negative electrode positioned either side of a separator composed of polyolefin fibers grafted with a vinyl monomer. The cell contains a device for absorbing and retaining nitrogen in a strongly basic medium, with a pH of at least 12. This device is constituted by the separator. A vinyl monomer solution is forced into the pores of the separator by drawing the solution through the separator, for example by using a suction pump.

13 Claims, 2 Drawing Sheets

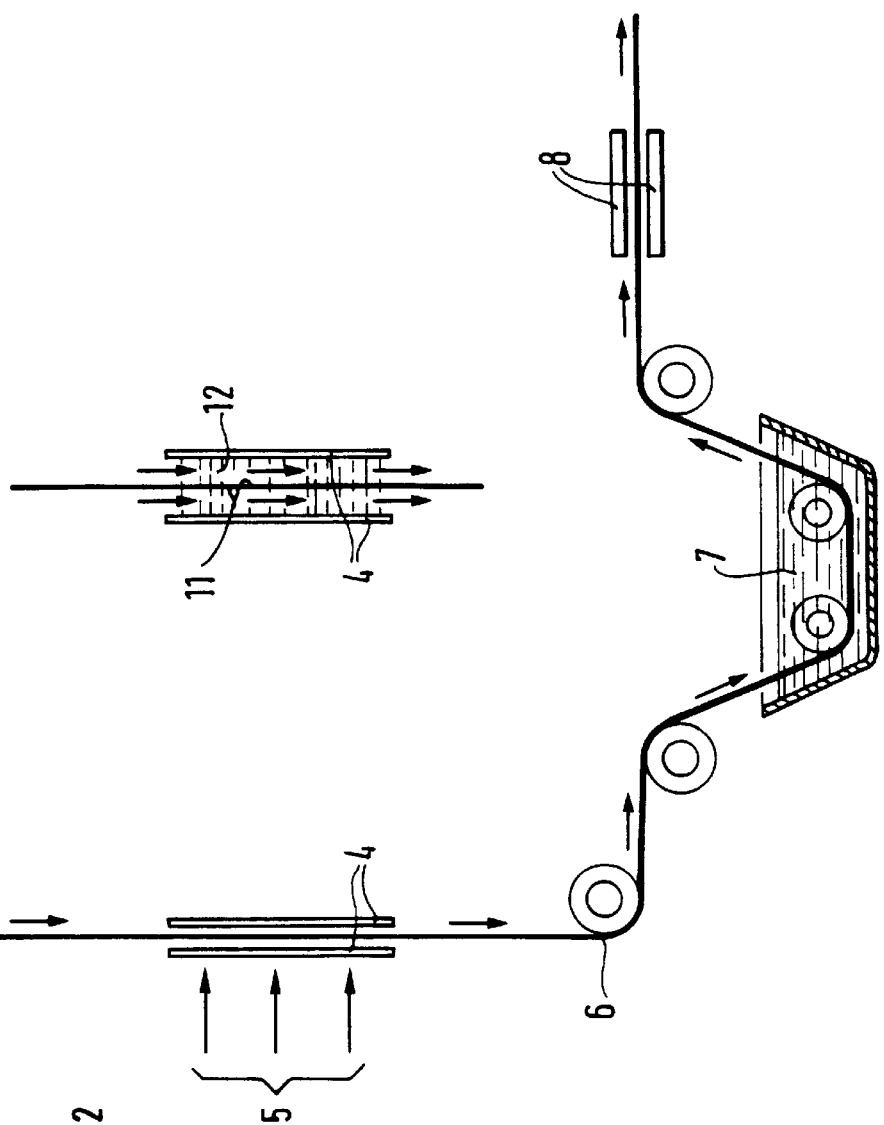
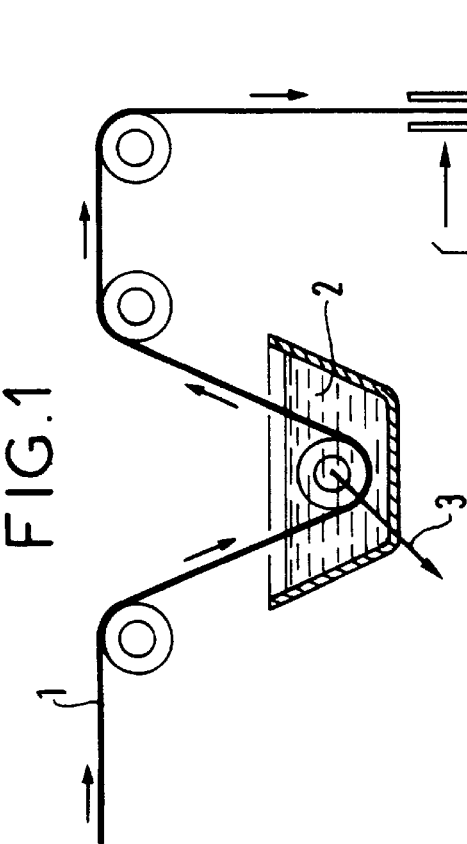

⊢——⊣ 100 μm

⊢——⊣ 100 μm

METHOD OF FORMING A SEPARATOR FOR ALKALINE ELECTROLYTE SECONDARY ELECTRIC CELL

BACKGROUND OF THE INVENTION

1. Field of the invention

The present invention concerns an alkaline electrolyte secondary electric cell, in particular a nickel-hydridable metal cell (Ni-MH).

2. Description of the Prior Art

The main advantage of secondary cells is their ability to store energy. However, a completely charged cell which is not used rapidly loses part of its charge. Nickel-cadmium (Ni-Cd) storage cells, for example, have long been used as an autonomous energy source. They are known to have good charge retention, i.e. when stored in the charged state the capacity falls slowly. The charge lost by a completely charged Ni-Cd cell is about 20% over 7 days at 40° C.

Since modern portable appliances require even more powerful autonomous energy sources, a new cell has recently been developed. This is the nickel-hydridable metal storage cell (Ni-M). Such a storage cell has a specific energy which is at least equal to that of the Ni-Cd storage cell but the self-discharge rate is high and thus the user is greatly inconvenienced. The charge lost by a Ni-MH storage cell which is stored in its completely charged state is about twice as much as that for a Ni-Cd storage cell, i.e. 40% over 7 days at 40° C. This poor result is due to the fact that the MH electrode, once charged, has a higher reducing character than the Cd electrode.

Self-discharge is generally attributed in part to nitrogen-containing shuttles. Ammonia and nitrites present in the storage cell are oxidized to nitrates at the positively charged electrode, discharging it. Also, nitrates and nitrites are reduced to ammonia at the negatively charged electrode, discharging that as well. Those reactions can occur a number of times since the species generated at the positive electrode will react at the negative electrode where they are transformed into species which are capable of reacting at the positive electrode. This is why they are called shuttles.

Reduction of nitrates and nitrites to ammonia is accelerated at an MH electrode. If such a reaction is the rate limiting step in the kinetics of the nitrogen-containing shuttle, then over a given period more shuttles can be produced in an Ni-MH storage cell. This hypothesis is generally accepted as the explanation for the high self-discharge rate in Ni-MH cells (Ikoma et al., J. Electrochem. Soc., 143, 6, 1996, 1904–1907).

In a cell, the positive and negative electrodes are separated by an insulative material which assures ionic conduction while preventing electrical contact between the two electrodes. In order to maintain electrical insulation between the two electrodes, the separator must be mechanically and chemically stable under service conditions. It must retain its properties during the entire service life of the cell. Further, a high ionic conductivity requires that the separator be uniformly wetted by the electrolyte.

In order to limit the influence of the nitrogen-containing species, it has been proposed to replace the polyamide separator generally used in Ni-MH storage cells by a polyolefin separator with a higher chemical stability in that medium. A polyamide separator is a potential source of nitrogen-containing impurities due to its deterioration in the highly alkaline electrolyte used in Ni-MH storage cells (U.S. Pat. No. 5,278,001).

The most frequently used separators at this time are based on polyethylene and/or polypropylene. Separators composed of fibers with a polypropylene core surrounded by a polyethylene sleeve are known in themselves, for example. However, polyethylene separators are difficult to wet in an aqueous electrolyte. In order to improve wettability, manufacturers have turned towards using separators which are grafted with hydrophilic monomers, which are generally vinyl compounds. The grafting method which has proved to be the most effective employs ionizing radiation, with the irradiation and grafting being carried out in two steps or simultaneously.

Such separators introduce no or very few nitrogen-containing species, but the other electrochemical components present in the cell remain unwanted sources of nitrogen-containing compounds. Thus self-discharge of a Ni-MH storage cell remains very much higher than that observed under the same conditions for a Ni-Cd storage cell.

The aim of the present invention is to propose a separator which increases charge retention in alkaline electrolyte secondary cells, in particular nickel-hydridable metal type cells.

SUMMARY OF THE INVENTION

The present invention consists in a secondary electric cell comprising at least one positive electrode and one negative electrode positioned either side of a separator composed of fibers of a polyolefin grafted with a vinyl monomer and containing means for absorbing and retaining nitrogen in a strongly basic medium, with a pH of at least 12, said means being constituted by said separator.

It has been established that, surprisingly, apart from the fact that it does not generate nitrogen-containing species, the separator of the present invention efficiently traps nitrogen-containing species originating from the other electrochemical components. It can therefore substantially reduce the quantity of nitrogen-containing shuttles which contribute to self-discharge of Ni-MH storage cells and therefore increase their charge retention.

The separator has an ability to absorb and retain nitrogen in a strongly basic medium, with a pH of at least 12, in a proportion of at least $3\times10^{-4}$ moles of nitrogen per gram of separator when the fibers are constituted by at least two polyolefins.

The separator may, for example, be constituted by fibers with a polypropylene core which is surrounded by a sleeve of polyethylene or a mixture of these fibers with fibers which contain only polyethylene.

The separator can absorb and retain nitrogen in a strongly basic medium, with a pH of at least 12, in a proportion of more than $5\times10^{-4}$ moles of nitrogen per gram of separator when said fibers are constituted by a single polyolefin.

The polyolefin is preferably selected from polyethylene and polypropylene. These polymers have the advantage of having high chemical stability in an alkaline medium.

The vinyl monomer is preferably selected from acrylic acid and methacrylic acid. Grafting with hydrophilic groups enhances the wettability of the separator.

The present invention also consists in a process for the production of a separator which can absorb and retain nitrogen in a strongly basic medium, composed of polyolefin fibers grafted with a vinyl monomer, the process comprising the following steps:

impregnating a porous separator composed of ungrafted polyolefin fibers with an aqueous solution containing a vinyl monomer by forcing the solution to penetrate into all of the pores of the separator, such that the volume of the solution retained by the separator after impregnation is at least equal to the pore volume of the separator ($\geq 100\%$ of the pore volume);

positioning the impregnated separator between two films of polyolefin with no gas being present between the surface of the impregnated separator and the surface of the film;

irradiating the assembly constituted by the separator and the films with ultraviolet radiation to graft the monomer over the entire surface of each of the fibers;

rinsing and drying the grafted separator.

Merely immersing the separator in the solution is insufficient for the solution containing the monomer to bathe the entire surface of each fiber and to be distributed homogeneously over the entire length of the fibers to the core of the separator. The solution must be forced to occupy all of the pores of the separator. This can be achieved by drawing the solution through the separator, for example using a suction pump.

The solution preferably also contains a grafting initiator, for example benzophenone.

Further, the separator must be constantly bathed in the monomer solution for the entire duration of the grafting operation. Loss of solution which may occur during this step, for example by evaporation, must therefore be limited.

The volume of the solution retained by the separator after impregnation and irradiation is preferably at least equal to the pore volume of the separator ($\geq 100\%$ of the pore volume).

In an advantageous variation, the solution is circulated between the separator and the films during irradiation. Thus the separator is surrounded by solution and loss through evaporation is prevented. A reserve of Fresh solution containing the monomer to be grafted is always in contact with the separator and depleted solution is evacuated.

Rinsing is preferably carried out using deionized water Solvents which are difficult to eliminate and/or liable to react chemically with the grafted separator must be avoided.

In a separator produced by the process described above the monomer is homogeneously grafted over the entire surface of each of the fibers.

The invention further consists in a nickel-hydridable metal secondary electric cell comprising at least one positive electrode and one negative electrode positioned either side of a separator produced by the process described above.

In a first embodiment of the invention, the polyolefin fibers are constituted by a mixture of polyethylene and polypropylene and the monomer is acrylic acid, the separator being capable of absorbing and retaining nitrogen in a proportion which is at least $3 \times 10^{-4}$ moles of nitrogen per gram of separator.

In a second embodiment of the invention, the polyolefin fibers are constituted by a single polyolefin selected from polyethylene and polypropylene and the monomer is acrylic acid, the separator being capable of absorbing and retaining nitrogen in a proportion which is at least $5 \times 10^{-4}$ moles of nitrogen per gram of separator.

Further features and advantages of the present invention will become apparent from the following examples which, of course, are given by way of non-limiting illustration and with reference to the accompanying drawings.

BRIEF DESCRIPTION OF THE DRAWINGS

FIG. 1 is a schematic view of a process for the production of the separator of the invention.

FIG. 2 shows a variant of the irradiation step of the process.

DETAILED DESCRIPTION OF THE PREFERRED EMBODIMENTS

Example 1

Figure 3:
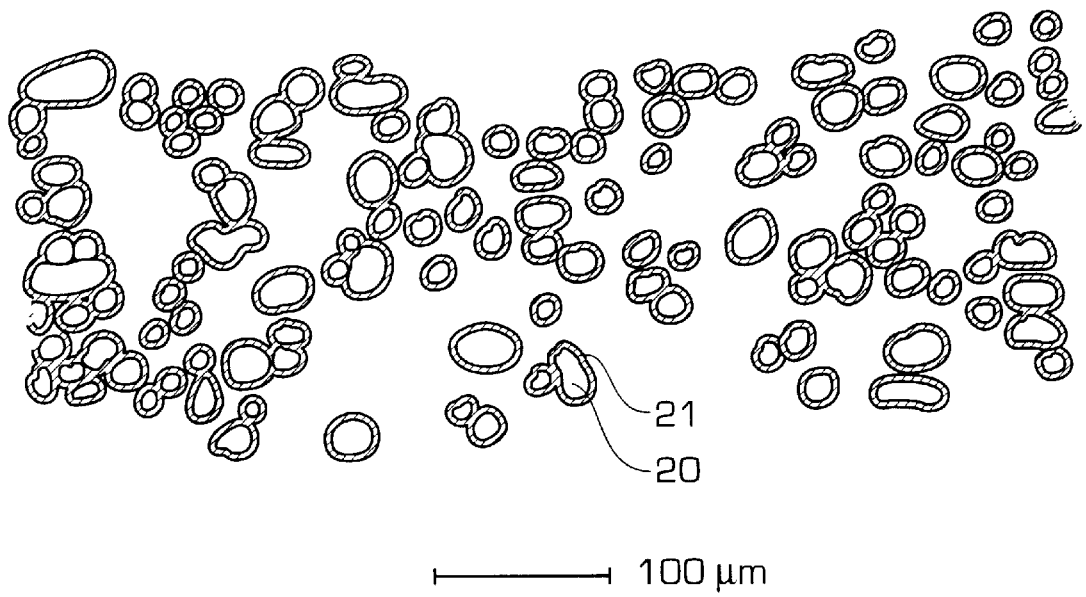
FIG. 3 is a scanning electron microscope (SEM) sectional view of a separator of the invention.

A non-woven material grafted separator A comprising fibers constituted by a mixture of 25% by weight of polyethylene and 75% of polypropylene was produced by the process of the present invention shown in FIG. 1.

During a first step, the ungrafted separator was impregnated with an aqueous solution 2 containing acrylic acid and a photoinitiator. A photoinitiator is an agent which increases the sensitivity of the polymer to ultraviolet radiation. The solution was drawn through the separator by means of a suction pump 3 to allow the solution to completely penetrate to the core of the separator. Thus all of the fibers constituting the separator could be reached for grafting. The separator weight gain (difference between the initial weight of the separator and its weight after impregnation, with respect to the initial weight) was 348%, representing 129% of the pore volume of the separator.

The second step comprised simultaneous irradiation and grafting. Two 50 µm thick films 4 of co-extruded polypropylene which was transparent to UV were positioned in intimate contact with each face of the separator so that there was no gas between the separator and the films. The separator between the two films 4 underwent ultraviolet irradiation at a power of 2 kW to effect grafting. A portion of the solution impregnating the separator escaped during this operation (evaporation . . . ) and the weight gain was only 312% after irradiation, i.e. 116% of the pore volume. The grafted separator 6 was then rinsed with deionized water at 7 then dried at 8 for 12 hours at 70° C.

By way of comparison, a separator A' grafted under analogous conditions to those applied to separator A but without using suction during impregnation or polypropylene films during irradiation had a weight gain of only 245% after impregnation, i.e. 91% of the pore volume, which dropped to 107% after irradiation (40% of the pore volume). Under these conditions the solution had clearly not penetrated to the core of the separator.

The ability of the grafted separator A to absorb and retain nitrogen was measured as follows.

The receptacle used was a 250 cm$^3$ conical flask, the ground-in stopper of which had been lubricated with plenty of silicone grease. The flask contained 125 cm$^3$ of an aqueous 8N KOH solution which initially contained $15 \times 10^{-4}$ moles of $NH_3$, into which 2 grams of separator A was introduced. After stirring, the flask was left for at least three days at 40° C. then for 2 hours at SOC to prevent the ammonia from evaporating when the stopper was opened. A 100 ml sample of the solution was removed and the remaining ammonia was measured using the KJELDAHL method. $NH_3$ was distilled and recovered in 10 cm$^3$ of a 0.1N HCl solution. Back titration of the HCl was carried out using an aqueous 0.1N potassium hydroxide KOH solution in the presence of a color indicator, in this case a 1% by weight alcoholic methyl red solution.

The capacity of the separator to absorb and retain nitrogen is defined as the difference between the number of moles of NH₃ initially introduced into the flask and the number of moles of NH₃ present in the solution for 1 gram of separator.

For separator A, the titration showed that $8.6 \times 10^{-4}$ moles of NH₃ remained in the solution. The trapping capacity of separator A was thus $3.2 \times 10^{-4}$ moles of nitrogen per gram of separator.

The distribution of the monomer on the surface of the fibers was studied using scanning electron microscopy (SEM). A sample of grafted separator was coated with resin and polished to enable the fibers to be observed in the transverse direction. The sample surface was then brought into contact with a solution of a cesium salt then rinsed with distilled water and dried. Microscopic observation of several samples of separator A showed that all of the fibers 20 had been grafted with monomer 21 (see FIG. 3) and the monomer was uniformly distributed over the entire surface all along the fibers.

An Ni-MH storage cell I was produced with a positive electrode the active material of which was nickel hydroxide and a negative electrode the active material of which was a metal alloy capable of absorbing hydrogen. These two electrodes were separated by 0.5 g of grafted separator. The assembly was wound and positioned in an AA format casing filled with an aqueous electrolyte composed of a mixture of potassium hydroxide KOH, sodium hydroxide NaOH and lithium hydroxide LiOH. The quantity of nitrogen-containing species contained in the storage cell which could contribute to the nitrogen-containing shuttles described above corresponded to $1.4 \times 10^{-4}$ moles of nitrogen.

Storage cell I containing separator A thus had a trapping capacity of $1.6 \times 10^{-4}$ moles of nitrogen, which was higher than the quantity of nitrogen present in the cell.

Storage cell I was electrochemically evaluated when stored under the following conditions. Storage cell I was charged then discharged twice then the capacity $C_2$ discharged in the second cycle at a rate of C/5 (a rate which will discharge the nominal capacity in 5 hours) was measured. It was charged a third time over 16 hours at a rate of C/10 (a rate which will discharge the nominal capacity in 10 hours). The storage cell was then stored for 7 days at 40° C. on open circuit. After returning to ambient temperature, the cell was completely discharged at a rate of C/5 (a rate which will discharge the nominal capacity in 5 hours), to determine the remaining capacity $C_3$.

The loss of capacity P is defined as the difference between the discharged capacity $C_2$ obtained during the second discharge and the discharged capacity $C_3$ obtained after being left for 7 days at 40° C., divided by the discharged capacity $C_2$ obtained during the second discharge:

$$P(\%) = \frac{C_2 - C_3}{C_2}$$

For storage cell I containing separator A, the loss of capacity P was 21%.

Example 2

A grafted separator B in accordance with the present invention analogous to separator A was produced using the process described in Example 1 with the exception that the irradiation step was carried out as follows, as illustrated in FIG. 2.

Two 50 μm thick co-extruded polypropylene films 4 which were transparent to UV were positioned either side of the separator so that a small space (at least 0.5 mm thick) remained between the surface 11 of the separator and each of the films 4. This space 12 was filled with the impregnating solution described in Example 1 so as to force out the gas. The solution between the separator and the films was forced to circulate, for example under gravity, so that the solution bathing the surface 11 of the separator was continuously renewed. The separator then underwent ultraviolet irradiation at 5 at a power of 2 kW to effect grafting. The separator was thus bathed in the solution circulating between the polypropylene walls and simultaneously exposed to the UV radiation.

The ability of separator B to absorb and retain nitrogen was measured as described in Example 1. Titration showed that $8.6 \times 10^{-4}$ moles of NH₃ remained in the solution. The trapping capacity of separator B was thus $3.2 \times 10^{-4}$ moles of nitrogen per gram of separator.

Example 3

By way of comparison, a commercially available grafted separator C, reference number 700/30, grafted by SCIMAT, was studied. Separator C was non-woven material comprising fibers constituted by a mixture of 25% by weight of polyethylene and 75% by weight of polypropylene.

The ability of separator C to absorb and retain nitrogen was measured as described in Example 1. Titration showed that $9.6 \times 10^{-4}$ moles of NH₃ remained in the solution. The trapping capacity of separator C was thus $2.7 \times 10^{-4}$ moles of nitrogen per gram of separator.

Figure 4:
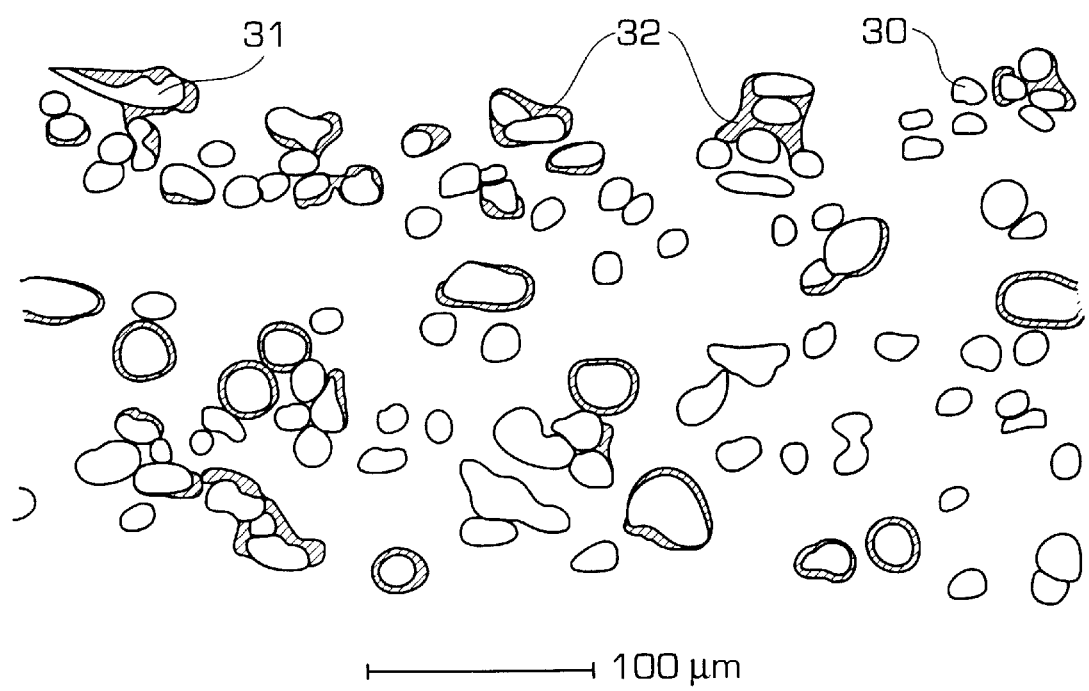
FIG. 4 is analogous to FIG. 3 for a separator which does not form part of the invention.

The monomer distribution on the fiber surface was studied by scanning electron microscopy (SEM) as described in Example 1. Microscopic observation of several samples of separator C showed that certain fibers 30 had not been grafted (see FIG. 4) and that the monomer 32 had not been homogeneously distributed over the entire surface of the fibers 31.

A Ni-MH storage cell II analogous to that described in Example 1, with the exception that it comprised separator C, was produced. Storage cell II thus had a trapping capacity of $1 \times 10^{-4}$ moles of nitrogen, which was less than the quantity of nitrogen present in the storage cell.

In the case of the storage cell II containing separator C, a loss of capacity P on storage of 53% was observed.

Example 4

A grafted separator D was produced in accordance with the present invention as described in Example 1. Separator D was a non-woven material comprising fibers constituted exclusively by polypropylene.

The ability of separator D to absorb and retain nitrogen was measured as described in Example 1. Titration showed that $3.6 \times 10^{-4}$ moles of NH₃ remained in the solution. The trapping capacity of separator C was thus $5.7 \times 10^{-4}$ moles of nitrogen per gram of separator.

A Ni-MH storage cell III was produced which was analogous to that described in Example 1 except that the quantity of nitrogen-containing species present in the storage cell corresponded to $2.4 \times 10^{-4}$ moles of nitrogen and that it comprised separator D. Storage cell III thus had a trapping capacity of $2.85 \times 10^{-4}$ moles of nitrogen, which was higher than the quantity of nitrogen present in the cell.

In the case of the storage cell III containing separator D, a loss of capacity P on storage of 21% was observed.

Example 5

By way of comparison, a commercially available grafted separator E, reference number 700/9, grafted by SCIMAT, was studied. Separator E was a non-woven material comprising fibers exclusively constituted by polypropylene.

The ability of separator E to absorb and retain nitrogen was measured as described in Example 1. Titration showed that $5.6 \times 10^{-4}$ moles of $NH_3$ remained in the solution. The trapping capacity of separator C was thus $4.7 \times 10^{-4}$ moles of nitrogen per gram of separator.

A Ni-MH storage cell IV was produced which was analogous to that described in Example 4 except that it comprised separator E. Storage cell IV thus had a trapping capacity of $2.35 \times 10^{-4}$ moles of nitrogen, which was lower than the quantity of nitrogen present in the cell.

In the case of the storage cell IV containing separator E, a loss of capacity P on storage of 48% was observed.

The results obtained in Examples 1 to 5 are summarized in the table below.

TABLE 1

| Cell | Separator | | Trapping moles | Self discharge |
|---|---|---|---|---|
| ref | ref | fibers | N/g | % |
| I | A | PP + PE | $3.2 \times 10^{-4}$ | 21 |
| — | B | PP + PE | $3.2 \times 10^{-4}$ | — |
| II | C | PP + PE | $2.7 \times 10^{-4}$ | 53 |
| III | D | PP | $5.7 \times 10^{-4}$ | 21 |
| IV | E | PP | $4.7 \times 10^{-4}$ | 48 |

There is claimed:

1. A process for the production of a separator which can absorb and retain nitrogen in a strongly basic medium, comprising the following steps:
   (a) forcing, into all the pores of a porous separator composed of ungrafted polyolefin fibers, an aqueous solution containing a vinyl monomer such that the volume of said solution retained by the impregnated separator is at least equal to the pore volume of said separator,
   (b) placing said impregnated separator between two films of polyolefin with no gas present between the surface of said impregnated separator and the surface of said film,
   (c) irradiating the assembly constituted by said separator and said films with ultraviolet radiation to graft said monomer over the entire surface of each of said fibers,
   (d) constantly bathing the separator in the monomer solution for the entire duration of the grafting steps (a), (b) and (c); and
   (e) rinsing and drying said grafted separator.

2. The process claimed in claim 1 wherein the volume of said solution retained by said separator after said impregnation and irradiation is at least equal to the pore volume of said separator.

3. A process claimed in claim 1 wherein said solution is circulated between said separator and said films during said irradiation.

4. The process claimed in claim 1 wherein said solution further contains a graft initiator.

5. The process claimed in claim 1 wherein said rinsing is carried out using deionized water.

6. A separator produced by a process as claimed in any one of claims 1 to 5 wherein said monomer is homogeneously grafted over the entire surface of each of said fibers.

7. A nickel-hydridable metal secondary electric cell comprising at least one positive electrode and one negative electrode positioned either side of a separator produced by a process as claimed in claim 1 wherein said polyolefin fibers are constituted by a mixture of polyethylene and polypropylene and said monomer is acrylic acid, said separator being capable of absorbing and retaining nitrogen in a proportion which is at least $3 \times 10^{-4}$ moles of nitrogen per gram of separator.

8. A nickel-hydridable metal secondary electric cell comprising at least one positive electrode and one negative electrode positioned either side of a separator produced by a process as claimed in claim 3 wherein said polyolefin fibers are constituted by a single polyolefin selected from polyethylene and polypropylene and said monomer is acrylic acid, said separator being capable of absorbing and retaining nitrogen in a proportion which is at least $5 \times 10^{-4}$ moles of nitrogen per gram of separator.

9. The process of claim 1, wherein the solution-forcing step comprises drawing the solution through the separator.

10. The process of claim 9, wherein the solution-forcing step comprises using a suction pump to draw the solution through the separator.

11. The process of claim 4, wherein the grafting initiator is benzophenone.

12. A method for reducing lost capacity in a cell to as low as, for 7 days storage, 21%, comprising providing the cell with a separator produced by the process of claim 1.

13. An impregnation method for grafting polyolefin fibers and a vinyl monomer solution for a grafted separator, comprising:
   a suction pump drawing a vinyl monomer solution through a porous separator.

* * * * *